March 25, 1958     W. T. WAGNER     2,827,666
METHOD FOR MANUFACTURE OF FIBER REINFORCED ARTICLES
Filed Jan. 11, 1955     2 Sheets-Sheet 1

INVENTOR.
WILLIAM T. WAGNER
BY
ATT'Y

INVENTOR.
WILLIAM T. WAGNER
BY
ATT'Y

United States Patent Office 2,827,666
Patented Mar. 25, 1958

2,827,666

METHOD FOR MANUFACTURE OF FIBER REINFORCED ARTICLES

William T. Wagner, Dayton, Ohio, assignor to The Dayton Rubber Company, a corporation of Ohio Application January 11, 1955, Serial No. 481,185

3 Claims. (Cl. 18—53)

This invention relates to a method for the manufacture of fibrous mats or pads and particularly to such mats as may be employed in the manufacture of fiber-reinforced foam rubber or expanded plastic items having corded depressions therein.

In the manufacture of many foamed rubber or plastic products by molding or continuous sheeting processes, it is desirable to employ a plurality of cores or core pins to impart a pattern of molded cavities or depressions opening on one or more surfaces of the finished product. A typical method of forming such recesses is to so arrange the core pins on one face of the mold cavity that, at the time of final vulcanization or setting of the foamed mass, the core pins will be submerged therein such that the recesses or depressions formed by their displacement of the mass will be permanently set. To bring the core pins into their desired displacing engagement with the foamed composition, one may insert the pins directly into the foamed or frothed material. In lieu of this, the pins may be so positioned near the unfrothed composition that, during the foaming and expansion thereof, the pins will be enveloped by the porous material.

Where, as is often the case, it is desired to incorporate fibrous material such as natural or artificial horsehair, bristles, cellulose fiber, asbestos and the like for purposes of reinforcing or stiffening the final product, serious difficulties have been encountered particularly where the cored depressions are desired. First, there is the problem of obtaining the desired arrangement of the fibrous material within the material. Then, there is the problem of maintaining this arrangement until the final vulcanization or setting has been completed without hindering or damaging the gelling or coagulation as well as the frothing and expansion of the basic substance.

If the core pins are not inserted into the foamed mass until the same has reached its point of maximum expansion, the incidence of the core pins with fibrous material arranged in the mass will cause the fibers to compress and at the same time to exert a similar compression force upon the matrix composition with the result that the foam will be destroyed and the expansion lost. If, on the other hand, the core pins are inserted above an unexpanded and unfrothed material which is allowed to expand the core pins will serve to retain the fibrous material such that it will not rise uniformly around the pins and even distribution of the fibrous material and its reinforcing effect will not be achieved. In either case, not only are the fibers arranged in different concentrations at various parts of the thickness of the final product, but also, the porosity and cellular characteristics of the final product will not be uniform.

The result of the foregoing obstacles has been that a successful coring of fiber-reinforced foamed rubber or plastic products has been unachievable and the advantages which attend the provision of core depressions in molded foam rubber or expanded plastic goods have not been applied to such material when fiber reinforcement has also been employed.

It is accordingly an object of the present invention to provide a fiber-reinforced foam rubber or plastic material in which the fibrous material is uniformly distributed, the porosity of the matrix composition is constant throughout, and the surfaces of the finished product are smooth and uniform.

It is another object of this invention to provide a method for the manufacture of such fiber reinforced foam rubber or plastic material in which the introduction of the fibrous material may be easily effected without damage to the unvulcanized foam.

It is yet a further object of this invention to provide advantages of the present invention which will be apparent from a reading of the following disclosure by preforming a fibrous bat in such a manner that the fibers therein are in substantially fixed relation and have cored depressions which will register with the core pins of the mold such that displacement of the fibers by these pins will not be involved.

A preferred method for preforming this fibrous bat comprises suspending a plurality of discrete and unassociated fibers of relatively short length in air or a similar gaseous medium and causing this medium, with the fibers therein, to pass through a controlled opening or to flow along a controlled path, across which is placed a perforated pallet, the shape of which conforms to the contours of the desired batting material. At the same time, the sieve-like perforations or openings through the pallet are such, that, although the air or other gas suspending vehicle may pass readily therethrough, the fibers in suspension will be collected upon the screen or pallet. Where, according to the teachings of this invention, this perforated pallet across an exhaust opening in an air suspension chamber is provided with core pins extending toward the suspension side of the pallet, the fibers deposited upon the pallet will be built up in a bat which will have core pin depressions corresponding to the actual core pins on the pallet. Depending upon the nature of the fibrous material employed, the fibers, when deposited upon the pallet in the air chamber, will become so interlocked that they will remain in the desired configuration in bat form until such time as the mass becomes integrated as a part of a fiber reinforced foam rubber article. On the other hand, certain fibers may be such that, once deposited upon the pallet and before being stripped therefrom, they should be coated with a suitable adhesive for preserving the desired configuration which they had been forced to assume as a result of the method and apparatus of the present invention.

For a more detailed description of the present invention in the terms of one preferred embodiment thereof, reference may be had to the following detailed description in connection with the appended drawings.

Figure 1:
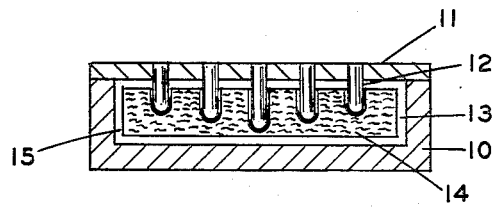
Figure 1 is a vertical cross section through a typical mold for the manufacture of fiber-reinforced articles of foamed rubber or plastic compositions.

Referring now to Figure 1, there is shown a conventional two-part mold comprising a bottom cavity member 10 and a top closure member 11 having depending core pins 12 and defining a cavity 13 for the molding of foamed rubber and plastic items. During the molding operation the rubber or plastic composition to be expanded or foamed is inserted in the cavity 13, and in those instances where the particular reinforcement considered desirable as explained above is sought, a fibrous bat 14 is inserted according to the present invention. In the usual construction the bat 14 will be spaced from the cavity walls by a passage 15 so that the immediate surface of the article will be free of the fibrous material and correspondingly smoother and more desirable to touch.

Figure 2:
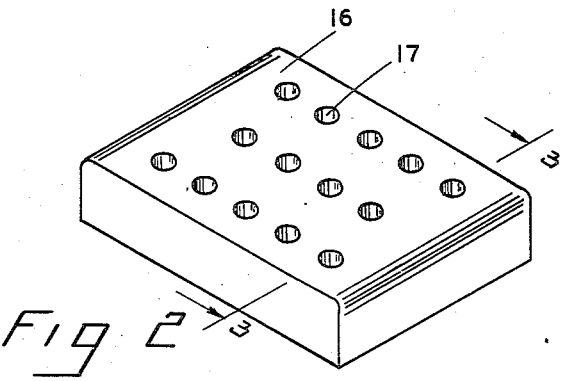
Figure 2 is a perspective of a cored fiber-reinforced foam rubber cushion manufactured according to the present invention.
Figure 3:
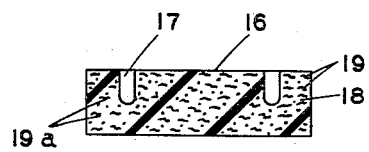
Figure 3 is a cross section through the article of Figure 2 on the line 3—3 thereof.

Referring now to Figures 2 and 3 and in greater detail to the product to be manufactured according to the present invention, the number 16 designates generally a typical pillow or cushion of the expanded or foamed rubber or plastic composition, said cushion having conventional core hole openings 17 upon the surface thereof to control the cushion's density and load-carrying characteristics.

The internal construction of this article is best shown in Figure 3 wherein the cushion 16 is shown to consist of a basic matrix of foamed rubber or plastic composition 18 interspersed in which are a plurality of discrete fibrous particles 19. Since the particles 19 will lend a reinforcing effect to the rubber-like matrix 18 and since this reinforcing effect will depend in part upon the relative position of the fibrous particles and the direction in which they extend, it follows that a uniform reinforcement with reference to any one surface or portion of the rubber-like cushion will require that the fibrous particles to be embedded therein should be aligned in substantially the same direction and should be uniformly distributed therethrough. It can be seen for example, if the bulk of the fibrous particles incorporated in the rubber cushion were in parallel relationship to the upper surface of this cushion, whereas those fibers 19a immediately adjacent to and lining the core depressions 17 followed the contour of the openings, such fibers would necessarily be disposed in a plane perpendicular to the upper surface of the cushion and to the remainder of the fiber such that a greater reinforcement of this upper surface against vertical displacement or deflection around the core opening thereon would result. The disadvantages of such reinforcement are believed to be apparent in that the concentration of reinforcement about the core hole openings would make a cushion for example extremely uncomfortable. It is to be noted, however, that the bat 14 of the present invention is so constructed and positioned in the finished article that the fibrous particles thereof are uniformly distributed and disposed throughout the entire expanded rubber or plastic composition such that the above previously described undesirable reinforcement is not present.

In order to achieve this desired uniformity of reinforcement and other objects and advantages of the present invention previously discussed, the fibrous reinforcing particles are first preformed into a bat wherein the fibers are uniformly arranged in substantially parallel relationship, notwithstanding the presence therein of cored depressions corresponding in size and location to depressions which will be desired in the final composite article of the fiber reinforced foamed rubber or plastic material.

Figure 4:
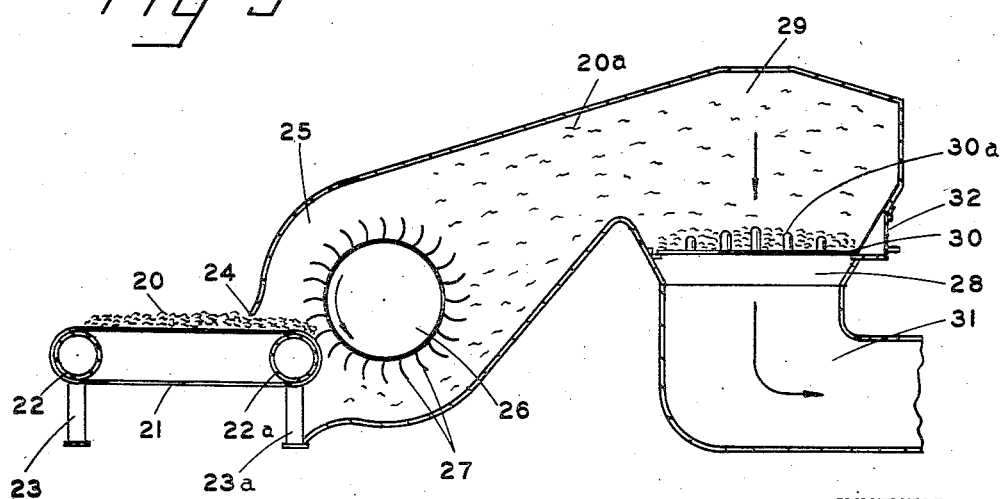
Figure 4 is a schematic elevation of an apparatus for suspending and collecting the fibers to be incorporated in an article such as shown in Figures 2 and 3.

One convenient apparatus for so preforming the reinforcing fibrous bat is shown in Figure 4 wherein the material such as a felted mat 20 of hair or textile fibers such as cotton, wool, etc. from which the fibers 20a are to be formed, is carried by a suitable conveyor such as the conveyor belt 21, passing about pulleys 22 and 22a supported respectively by mounts 23 and 23a, into the mouth 24 of the air suspension chamber 25. Once inside the suspension chamber the mat of felted fibers 20 is contacted by the picking mechanism which consists of a hub or wheel 26 about which are mounted a plurality of vanes or hooks 27 which will grasp the individual fibers and separate them from the mass 20 and deliver them into the cyclone chamber 29. At the exhaust outlet across the neck 28 connecting the cyclone, fiber-suspension chamber with the exhaust channel 31 is placed a perforated pallet 30 of sufficiently perforated construction to allow for the passage of air therethrough, the perforations being sufficiently fine to catch and accumulate the individual fibers that are suspended in the air which endeavors to pass therethrough. As the air thus passing through the pallet 30 causes a greater and greater accumulation of fibers upon the surface thereof, a fibrous bat will be built up in considerable thickness depending upon the time which pallet is allowed to exist in the fiber carrying air flow. The fibers thus deposited upon the pallet, because of the uniformity of the factors causing their deposit, will be uniformly arranged thereon and, as the passage of air through the pallet endeavors to force fibers through to the exhaust passage 31, wherein the pressure is slightly reduced as opposed to the back pressure condition on the suspension side of the pallet, the individual fibers will be pressed more firmly against the base of the pallet 30. This pressure will cause the same to become aligned parallel to the planar surface of the pallet notwithstanding the presence thereon of the protruding cores 30a.

Figure 5:
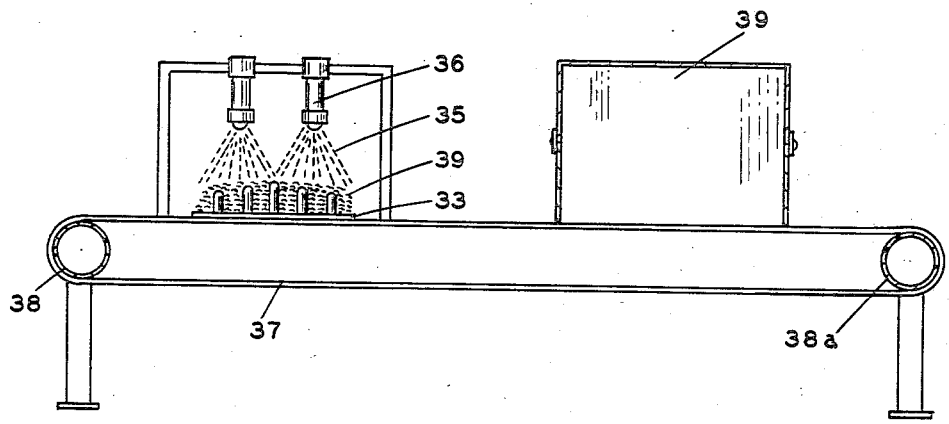
Figure 5 is a schematic elevation showing a method and apparatus for treating the batting formed as in Figure 4.

Once the fibrous material has been built up on the pallet 30 to the desired thickness usually at least covering the cores 30a, the pallet is removed by convenient means such as a trap door 32 or a similar opening, and, while the fibers are positioned thereon in loosely associated fashion, the pallet may be placed upon a suitable conveyor such as the belt 37 passing about pulleys 38 and 38a in Figure 5. The fibers 34 loosely arranged on the pallet 33 corresponding to the pallet 30 in the apparatus of Figure 4 are then treated with a spray of latex or similar bonding material 35 from nozzles or spray heads 36. Where a latex rubber type binder is employed, it is sometimes desirable that the same be vulcanized or at least partially cured and for this purpose the fibrous bat, once sprayed with the adhesive composition, is passed while on the same conveyor belt 37 through the hot air drying or vulcanizing oven 39.

Figure 6:
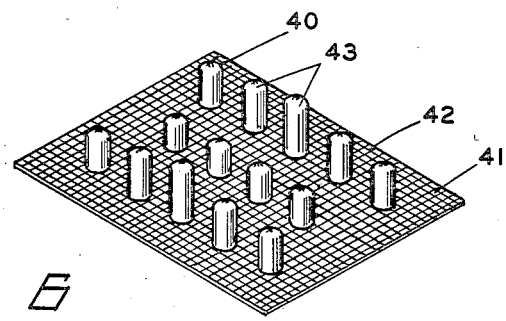
Figure 6 is one preferred form of a pallet suitable for incorporation in the device of Figure 4.
Figure 7:
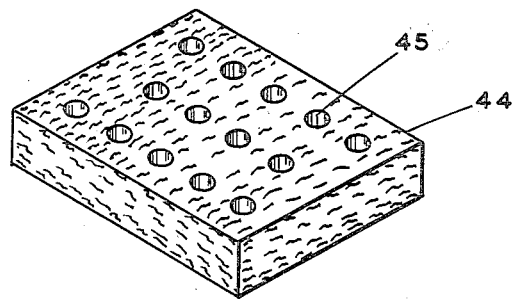
Figure 7 is a perspective of the fibrous mat prior to its incorporation in foamed matrix compositions according to this invention.

A typical pallet to be employed in the apparatus of Figure 4 is shown in Figure 6 to consist of fine wire screen or mesh composed of square-woven wire 42 forming small screen or sieve-like openings 41 through which the fiber laden air may pass. Upon the upper surface of this screen 40 or upon that surface facing the direction of the air flow, are mounted a plurality of core pins 43 corresponding in contour and dimension to the cored depressions desired in the preformed bat which in turn, conforms in size and dimension to the core hole openings desired in the finished composite fiber-reinforced articles. The depressions formed by the pallet core pins 43 will, of course, be slightly larger than the core holes of the final product since it is usually desirable that the fibrous reinforcing material not be exposed to the surfaces of the finished product. Where at least the walls of these core pin appendages 43 are solid or imperforate, there are no forces acting to cause the suspended fibers to align themselves parallel to the walls of the pins in the manner in which they so align themselves on the perforated base 40. Consequently, even those fibers immediately adjacent the pins 43 will be parallel to the other fibers elsewhere in the bat so that a uniform reinforcement will be provided.

The resulting fibrous bat 44 having the shape, size and core depressions 45 corresponding to the desired shape, size and core hole pattern of the finished article as well as the core pin location in the mold, may be readily inserted in the mold, either along with, before or after the insertion into the cavity thereof of the rubber or plastic material to be foamed or expanded to permeate this fibrous bat in the formation of the composite article. In order to insure registry of the core pins of the mold with the depressions of the bat, the latter may be positioned over the mold core pins prior to closing the mold.

References in this disclosure to the term "plastic" are meant to include those substances which contain as an essential ingredient an organic substance of large molecular weight, are solid in their finished state, and, at some stage in their processing into finished articles, can be shaped by flow. For purposes of illustration, rubber has been employed as an example of such materials, but it is to be understood that this invention encompasses the use of other foamed plastics as well.

I claim:

1. In a method for the manufacture of a molded combination foam-fiber article having core openings upon at least one surface thereof, that improvement which comprises preforming a cored bat of matted fibers by first collecting a plurality of discrete fibers upon a perforated pallet having core pins thereon positioned in accordance with the core openings desired in the bat and in the final molded product and spraying the collected mass thus positioned upon said pallet with an adhesive prior to stripping the bat from said pallet and inserting the same in the mold in such manner that the cored depressions of the bat register with the core pins of the mold.

2. A method of manufacturing a molded combination foam-fiber article having core openings upon at least one surface thereof, that improvement which comprises preforming a cored bat of matted fibers by accumulating a plurality of discrete fibers upon a pallet having core pins thereon, forming cored openings around said pins which are larger than the core openings in the finished article, spraying the collected mass thus positioned upon said pallet with an adhesive, stripping the bat from said pallet, inserting said bat in a mold to register the cored openings of the bat with appropriate core pins of said mold, introducing a foam material into the mold whereby the material infiltrates the fibrous mass and fills the mold cavity surrounding the same, and subjecting the fiber and foam material to vulcanizing conditions.

3. A method of manufacturing a molded combination foam-fiber article having core openings upon at least one surface thereof, that improvement which comprises preforming a cored bat of matted fibers by accumulating a plurality of discrete fibers upon and parallel to the plane of a pallet having core pins thereon, forming cored openings around said pins, spraying the collected mass thus positioned upon said pallet with an adhesive, stripping the bat from said pallet, inserting said bat in a mold to register the cored openings of the bat with appropriate core pins of said mold, introducing a foam material into the mold whereby the material infiltrates the fibrous mass and fills the mold cavity surrounding the same, and subjecting the fiber and foam material to vulcanizing conditions.

References Cited in the file of this patent

UNITED STATES PATENTS

| | | |
|---|---|---|
| 1,882,599 | Hodshon | Oct. 11, 1932 |
| 2,140,063 | Talalay | Dec. 13, 1938 |
| 2,194,036 | Talalay | Mar. 19, 1940 |
| 2,587,814 | Borkland | Mar. 4, 1952 |